United States Patent Office 3,261,335
Patented July 19, 1966

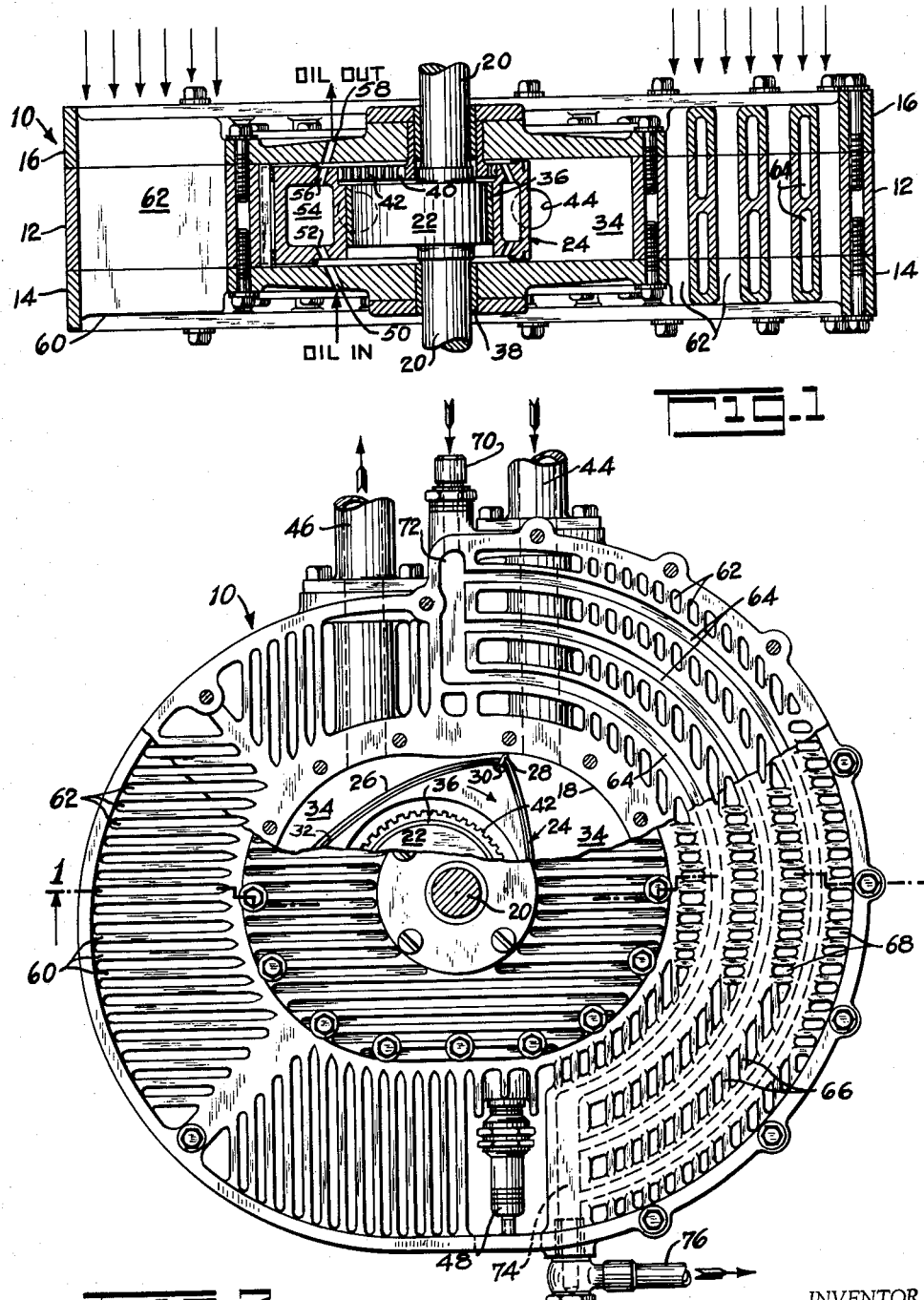

3,261,335
OUTER BODY CONSTRUCTION FOR ROTARY COMBUSTION ENGINES
Hans-Georg Zimmermann, Heilbronn, Germany, assignor to NSU Motorenwerke Aktiengesellschaft Neckarsulm, and Wankel G.m.b.H., Landau (Bodensee), Germany
Filed Oct. 21, 1964, Ser. No. 405,346
Claims priority, application Germany, Nov. 22, 1963, N 24,053
7 Claims. (Cl. 123—8)

This invention relates to rotary combustion engines and in particular to an outer body construction which is air cooled and has in combination therewith a liquid cooler for removing heat from a liquid coolant used in cooling the rotor of said rotary combustion engine.

It has been known to use a liquid cooler in combination with an air cooled engine which liquid cooler is normally disposed at the intake region of the blower for the air cooled outer body which liquid cooler is normally in the form of a ring-type cooler. With this arrangement, the cooling air is sucked in by the blower and first passes over the liquid cooler prior to its entry into the blower which air is then circulated over the rotary combustion engine outer body. This type of structure results in poor efficiency in the use of the cooling air since the temperature of the air is raised prior to its entry into the blower which decreases the cooling action of the air on the outer body. Also, because of the location of the liquid cooler, the blower drive unit is elongated and provides a more bulky structure and access to the blower end of the engine shaft is made difficult. A further disadvantage of this type of construction lies in the fact that control of the cooling air in accordance with the cooling requirement of the outer body is difficult and may result in overcooling portions of the outer body which do not have a relatively high heat input and thus may cause undesirable stresses leading to distortion of the outer body.

In the present invention the outer body is preferably air cooled while the inner body or rotor is preferably liquid cooled. A liquid cooler or radiator is generally provided for removing heat from the liquid coolant for the rotor so that the coolant may be recirculated through the rotor for removing heat therefrom. In the present invention the liquid cooler is provided in a portion of the outer body having relatively low heat input or a relatively cold region of said outer body and is provided with a plurality of cooling air passages for removing heat from the liquid coolant. In the relatively hot portion of the outer body a plurality of fins forming cooling air passages are provided for removing heat from said relatively hot portion of the outer body. By providing a liquid cooler in the relatively cold portion of the outer body, said relatively cold portion is not overcooled since the heat rejection from the liquid cooler tends to warm up this portion of the housing and thus a balance is maintained between the relatively hot and cold portions of the outer body which tends to minimize thermal distortions of said outer body. It will be further seen that effective cooling of the liquid for a liquid cooled rotor and effective air cooling of the outer body is provided without the necessity of increasing the cooling blower output and that the construction of the invention provides for a compact outer body structure.

Accordingly it is one object of the invention to provide a novel and improved outer body construction for a rotary combustion engine.

It is another object of the invention to provide a novel and improved outer body construction for a rotary combustion engine including the combination of an air cooled liquid cooler with an air cooled outer body.

It is still another object of the invention to provide a novel and improved outer body construction for a rotary combustion engine wherein thermal stresses are minimized and effective cooling of the outer body is provided.

Other objects and advantages will be best understood and become apparent upon reading the following detailed description of the invention with the accompanying drawings wherein:

FIG. 1 is a sectional view of the engine of the invention taken on line 1—1 of FIG. 2;

FIG. 2 is a plan view of the engine of the invention with a portion of one of the end walls removed.

In FIGS. 1 and 2 there is shown a rotary mechanism embodied in the form of a rotary combustion engine which is composed of an outer body 10 including a peripheral wall 12 interconnected with a pair of end walls 14 and 16 to form a cavity. The profile of the inner surface 18 of the outer body peripheral wall 12 is preferably basically a two-lobed epitrochoid (FIG. 2). A shaft 20 is mounted coaxially with the cavity formed by the outer body and is rotatable relative to said outer body. The shaft 20 has an eccentric portion 22 formed thereon upon which is supported a rotatable rotor 24 having a multi-lobed profile whose outer peripheral wall 26 forms a plurality of circumferentially-spaced apex portions for sealing engagement with the inner surface 18 of the outer body peripheral wall 12. Preferably, but not shown, the rotor has three apex portions and the multi-lobed cavity of the outer body has two-lobe portions although other combinations are possible. Seal strips 28 are provided in each of the apex portions of the rotor 24 and extend from one end face of the rotor to the other end face and are in continuous sealing engagement with the inner surface 18 of the outer body peripheral wall 12 to form a plurality of working chambers 34 which during relative rotation of the rotor 24 and outer body 10 vary in volume. Intermediate seal bodies 30 mate with the apex seals 28 in the apex portions of the rotor and with side seals 32 in each of the end walls of the rotor to provide a continuous seal adjacent to the periphery of the rotor and on each side thereof.

As further illustrated, the rotor 24 is supported on the eccentric portion 22 by a sleeve-type bearing 36. Suitable bearings 38 are also provided for supporting the rotating shaft 20 in the outer body housing, and on one side of the rotary combustion engine a fixed externally-toothed gear 40 is provided which meshes with an internally-toothed gear 42 supported by the rotor for rotatably positioning the rotor with respect to the epitrochoidal surface of the peripheral wall 12 but said gears do not drive or impart torque to the shaft 20. An intake port 44 is provided for admitting air and/or a fuel-air mixture, an exhaust port 46 is provided for expelling the burnt gases from the engine and an ignition means comprising a spark plug 48 may be provided for igniting the mixture so that during engine operation the stages of intake, compression, expansion and exhaust may be carried out. Reference may be made to U.S. Patent 2,988,065, issued on June 13, 1961, to Felix Wankel et al. for a more detailed description of the type engine described above.

As explained above, the rotor is preferably liquid cooled. The cooling mechanism for the rotor may include an inlet passage 50 in one of the outer body end walls such as that shown in FIG. 1 in end wall 14 which inlet passage may be connected to a suitable liquid supply source such as an oil reservoir, an oil pump, etc. The rotor 24 is made hollow and is provided with an inlet passage 52 in one end wall thereof for supplying oil or liquid coolant from the end wall inlet 50 to compartments 54 provided in the interior of the rotor. A drain channel may be provided in the opposite end wall of the rotor such as illustrated at 56 for removing oil or liquid coolant from the rotor compartments which may thereby be drained from the outer body through a drain channel 58 in the outer body end wall 16. However, it should be understood that the liquid cooling mechanism for the rotor itself is not considered as a part of the invention and any suitable system may be used such as that illustrated in U.S. Patent 3,102,682 to Paschke, issued on September 3, 1963, and assigned to the same assignee as the present application.

It will be apparent in the operation of the rotary combustion engine of the invention that the working cycles of operation always take place adjacent the same region of the outer body 10. For example, combustion will always take place adjacent the spark plug 48 and the region of the outer body 10 from adjacent said spark plug 48 in the direction of rotor rotation, as indicated by arrow D, to the exhaust port 46 will have a substantially high heat input while the region from the intake port 44, in the direction of rotor rotation, to the spark plug 48 will have a relatively low heat input. Thus it will be seen that one region of the outer body will be relatively hot while the other will be relatively cold.

The outer body of the engine of the invention is preferably air cooled. An axial flow air cooling system is provided which comprises a plurality of fins 60 provided on the outer periphery of the peripheral wall 12 and the end walls 14 and 16 which fins are spaced so as to provide a plurality of axially-extending air cooling passages 62. It will be seen from FIGS. 1 and 2 that the flow of air through the cooling passages 62 will be in a direction parallel to the outer body axis. In the relatively cold portion of the outer body, that being from the intake port 44 in the direction of rotor rotation to the spark plug 48, a liquid cooler is provided for removing heat from the liquid coolant for the rotor 24. The liquid cooler comprises a plurality of spaced channels 64 which extend in a peripheral direction around a portion of the outer body from a region adjacent the intake port 44 in the direction of rotor rotation to a region adjacent the spark plug 48. As can be seen in FIGS. 1 and 2, the liquid cooling channels are radially-spaced from one another relative to the outer body axis. Referring to FIG. 1, it will be seen that each liquid cooling channel 64 is formed by providing a cut out in the peripheral wall 12 which is joined by mating cut outs in each end wall 14 and 16, respectively, to form an enclosed liquid cooling channel. Suitable sealing means (not shown), such as a gasket, may be placed between the end walls and the peripheral wall at the juncture of the cut outs between said end walls and the peripheral wall to prevent liquid leakage from the liquid cooling channels 64. As illustrated, the end walls are tightly secured to the peripheral wall by bolts or other suitable means.

As stated above, the liquid cooling channels 64 are radially spaced, and a plurality of fin-like webs 66 are disposed between the channels 64 with said webs being spaced so as to provide air cooling passages 68 therebetween. A liquid coolant inlet 70 is provided at one end of the liquid cooling channels 64, said inlet 70 being disposed adjacent the intake port 44. The liquid coolant inlet 70 communicates with an inlet manifold 72 which is common to each of the liquid cooling channels 64. The inlet 70 may be suitably connected to drain channel 58 in the outer body for supplying the heated liquid coolant from the rotor 24 to the liquid cooling channels 64 for circulation therethrough. The heated liquid coolant will then circulate around the periphery of the relatively cold portion of the outer body 10 through the liquid cooling channels 64 and will warm this portion of the outer body and will collect in an outlet manifold 74 for drainage through an outlet 76 where the coolant may then be recirculated to the rotor 24 by a suitable pump (not shown) or other suitable means.

It will be seen that the cooling fins 60 and the fin-like webs 66 are aligned substantially the same on their respectively sides of the outer body so that the cooling passages 62 and 68 are substantially similarly aligned in the axial direction. Because of the disposition of the liquid cooler on the relatively cold side of the housing or outer body 10, this side of the outer body will be warmed and thus minimize the temperature difference between the relatively hot portion of the housing and the relatively cold portion thereof and as a result the thermal stresses will be minimized thus decreasing the likelihood of thermal distortion of said outer body. The cooling air is supplied by a suitable axial-type blower (not shown) and the cooling air will be passed through the cooling air passages 62 and 68 for removing heat from the relatively hot portion of the outer body and for removing heat from the liquid coolant circulated through the liquid cooler. By the construction of the invention, a compact outer body structure is provided wherein both the functions of cooling the relatively hot portion of the housing and providing a liquid cooler for the liquid coolant used to cool the rotor without the necessity of using an increase in blower size for separately carrying out these two functions. Thus, the relatively hot portion of the outer body is effectively cooled without any overcooling of the relatively cold portion of the outer body and the heated liquid coolant will be cooled so that the rotor may also be effectively cooled. As also explained above, the structure of the invention serves to reduce the temperature differences between the relatively hot and cold sides of the housing thereby minimizing thermal distortions in the outer body.

From the above description it will be seen that a novel and improved outer body construction is provided which includes an air cooled structure for the relatively hot portion thereof and means for cooling the liquid coolant used in cooling the rotor. While the invention has been specifically set forth in its preferred embodiment, it will be obvious to those skilled in the art after understanding the invention, that various changes and modifications may be made therein without departing from the spirit and scope thereof. It is intended in the appended claims to cover all such modifications.

What is claimed is:

1. An outer body construction for a rotary combustion engine having a liquid cooled rotor and wherein the engine working cycles always take place adjacent the same region of the outer body so that the outer body has a relatively cold region and a relatively hot region, a first plurality of spaced cooling fins projecting from the outer periphery of said outer body in the relatively hot region thereof with said spaced cooling fins forming cooling air passages therebetween, a second plurality of spaced cooling fins projecting from the outer periphery of said outer body in the relatively cold region thereof, and liquid cooler means disposed adjacent to the relatively cold region of said outer body for cooling the liquid coolant for the rotor, said liquid cooler and said second plurality of cooling fins cooperating to form a plurality of air cooling passages passing through said liquid cooler so that cooling air passing over said outer body will remove heat from both said relatively hot and said relatively cold regions of said outer body and said liquid cooler means in the relatively cold region of said outer body.

2. An outer body construction for a rotary combustion engine as recited in claim 1 wherein said cooling air passages in said relatively hot portion of said outer body and said cooling air passages through said liquid cooler in the relatively cold region of said outer body extend in a direction parallel to the outer body axis.

3. An outer body construction for a rotary combustion engine as recited in claim 1 wherein said liquid cooler comprises a plurality of spaced liquid coolant channels with said channels extending in a circumferential direction around the relatively cold region of said outer body and said cooling air passages through said liquid cooler in the relatively cold region of said outer body extend in a direction parallel to the outer body axis.

4. An outer body construction for a rotary combustion engine as recited in claim 3 wherein said outer body includes a peripheral wall interconnected with a pair of end walls and each said liquid coolant channel includes a cut-out portion in said peripheral wall and a cut-out portion in each said end wall with said cut-out portions being disposed in mating relationship to form an enclosed liquid coolant channel.

5. An outer body construction for a rotary combustion engine as recited is claim 3 further comprising an inlet manifold disposed at one end of said liquid coolant channels and an outlet manifold disposed at the other end of said liquid coolant channels with said inlet and outlet manifolds being common to each said liquid coolant channel and said inlet and outlet manifolds having an inlet and outlet port, respectively, for supplying and draining liquid coolant from said liquid coolant channels.

6. An outer body construction for a rotary combustion engine as recited in claim 3 wherein said liquid coolant channels are arcuate and extend around a portion of the outer body axis and are spaced radially from one another.

7. An outer body construction for a rotary combustion engine as recited in claim 3 wherein said outer body has an arcuate contour in said relatively cold region and said liquid coolant channels substantially conform to the contour of said outer body.

No references cited.

MARK M. NEWMAN, *Primary Examiner.*

F. T. SADLER, *Assistant Examiner.*